(12) United States Patent
Song et al.

(10) Patent No.: US 10,964,012 B2
(45) Date of Patent: Mar. 30, 2021

(54) AUTOMATIC LIVER SEGMENTATION IN CT

(71) Applicant: Sony Corporation, Tokyp (JP)

(72) Inventors: Bi Song, San Jose, CA (US); Ko-Kai Albert Huang, Cupertino, CA (US); Ming-Chang Liu, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 142 days.

(21) Appl. No.: 16/009,076

(22) Filed: Jun. 14, 2018

(65) Prior Publication Data

US 2019/0385299 A1 Dec. 19, 2019

(51) Int. Cl.
| | |
|---|---|
| *G06K 9/68* | (2006.01) |
| *G06T 11/00* | (2006.01) |
| *G06T 7/00* | (2017.01) |
| *G06T 7/11* | (2017.01) |
| *G06T 7/143* | (2017.01) |
| *G06T 7/149* | (2017.01) |
| *G06T 7/162* | (2017.01) |

(52) U.S. Cl.
CPC .......... *G06T 7/0006* (2013.01); *G06K 9/6857* (2013.01); *G06T 7/11* (2017.01); *G06T 7/143* (2017.01); *G06T 11/008* (2013.01); *G06T 2207/10081* (2013.01); *G06T 2207/20076* (2013.01); *G06T 2207/30056* (2013.01)

(58) Field of Classification Search
None
See application file for complete search history.

(56) References Cited

U.S. PATENT DOCUMENTS

| | | | |
|---|---|---|---|
| 8,594,409 B2 | 11/2013 | Kim | |
| 8,913,830 B2 * | 12/2014 | Sun | ........................ G06K 9/342 |
| | | | 382/173 |
| 10,032,281 B1 * | 7/2018 | Ghesu | ...................... G06T 7/187 |
| 2015/0078641 A1 * | 3/2015 | Tan | ........................... G06T 7/12 |
| | | | 382/131 |

FOREIGN PATENT DOCUMENTS

CN 104809723 A 7/2015

OTHER PUBLICATIONS

Jiang et al., "Liver Segmentation Based on Snakes Model and Improved GrowCut Algorithm in Abdominal CT Image," Hindawi Publishing Corporation, Computational and Mathematical Methods in Medicine, vol. 2013, Article ID 958398, 12 pages http://dx.doi.org/10.1155/2013/958398 (Year: 2013).*

(Continued)

*Primary Examiner* — Soo Shin
(74) *Attorney, Agent, or Firm* — Trellis IP Law Group, PC

(57) ABSTRACT

A method for automatic organ segmentation in CT images comprises in a first step, rough region segmentation; in a second step, coarse organ segmentation; and in a third step, refinement of organ segmentation. The organ may be a liver. Rough region segmentation may comprise applying standard anatomical knowledge to the CT images. Coarse segmentation may comprise identifying organ voxels using a probabilistic model. Refinement of organ segmentation may comprise refinement based on intensity, followed by refinement based on shape. Apparatuses configured to carry out the method are also disclosed.

18 Claims, 8 Drawing Sheets

(56) References Cited

OTHER PUBLICATIONS

Maeda et al., "Automatic Segmentation of Liver Region Employing Rib Cage and Its 3-D Displaying," SICE-ICASE International Joint Conference, 2006 (Year: 2006).*

Shinya Maeda et al.; "Automatic Segmentation of Liver Region Employing Rib Cage and Its 3-D Displaying": 2006 SICE-ICASE International Joint Conference; Oct. 2006.

Akshat Got Ra et al: "Liver segmentation: indications, techniques and future directions", Insights Into Imaging, vol. 8, No. 4, Jun. 14, 2017 (Jun. 14, 2017), pp. 377-392' XP055624840, DOI: 10.1007/s13244-017-0558-1 y abstract, Figs. 1-16, pp. 377-390.

Li Guodong et al: Automatic Liver Segmentation Based on Shape Constraints and Deformable Graph Cut in CT Images, IEEE Transactions on Image Processing, IEEE Service Center, Piscataway, NJ, US, vol. 24, No. 12, Dec. 2015 (Dec. 2015), pp. 5315-5329, XP011586290, ISSN: 1057-7149, DOI: 10.1109/TIP.2015.2481326 [retrieved on Oct. 6, 2015] abstract, Figs. 1-12, Tables I-III, Algorithms 1-2, sections I-VIII.

Ruchaneewan Susomboon et al: 11A Hybrid Approach for Liver Segmentation "In: 11 3D Segmentation in The clinic: A Grand Challenge", 2007, https://web.archive.org/web/20170810050359 /http://mbi.dkfz-heidelberg.de/grand-chall enge2007/web/p151.pdf, XP055624813, pp. 151-160, abstract, Figs. 1-6, sections 1-5.

Yufei Chen et al: "The domain knowledge based graph-cut model for liver CT segmentation", Biomedical Signal Processing and Control, vol. 7, No. 6, Nov. 2012 (Nov. 2012), pp. 591-598, XP055624960, NL ISSN: 1746-8094, DOI: 10.1016/j.bspc.2012. 04.005 abstract, Figs. 1-4, sections 1-5.

Lombaert H et al: A Multi level Banded Graph Cuts Method for Fast Image Segmentation, Computer Vision, 2005. ICCV 2005. Tenth IEEE International Conference on Beijing, China Oct. 17-20, 2005, Piscataway, NJ, USA,IEEE, Los Alamitos, CA, USA, vol. 1, Oct. 17, 2005 (Oct. 17, 2005), pp. 259-265, XP010854797, DOI: 10.1109/ICCV.2005.13 ISBN: 978-0-7695-2334-7 abstract, section 2, Fig. 1.

\* cited by examiner

AUTOMATIC LIVER SEGMENTATION IN CT

BACKGROUND

Accurate liver segmentation from abdominal CT scans is critical for computer-assisted diagnosis and therapy, including patient specific liver anatomy evaluation, functional assessment, treatment planning, and image-guided surgery. Traditionally, radiologists or physicians manually delineate the liver region in the images, slice by slice, which is tedious and time-consuming.

FIG. 1 illustrates some challenges in liver segmentation posed by intensity inhomogeneity within the liver. White arrows in CT scan 102A indicate two adjacent regions of liver tissue which exhibit different intensities. White arrows in CT scan 102B indicate adjacent regions of liver tissue that appear different on the basis of intensity distribution as well as average value. CT scan 102C shows a slice including a tumor 103 and normal liver tissue 104. Tumor 103 appears significantly darker than normal liver tissue 104. In scan 102D, a white arrow indicates a circular region of tumor tissue which is extremely dark in comparison to the surrounding normal tissue.

Significant intensity difference therefore cannot be taken as necessarily indicating a boundary between the liver itself and other organs or tissues outside the liver FIG. 2 illustrates some other challenges in liver segmentation, posed by intensity similarities in the regions just inside and just outside the liver boundary. CT scan 202A shows a slice in which the intensity of the liver 204 is very similar to the intensity of the stomach 203. Similarly, in scan 202B, it is hard to determine a significant difference between the intensities at the heart 205 and liver 204B. A white arrow in scan 202C near the outer boundary of the liver shows a region of very low contrast between the liver itself and muscle tissue at the abdomen wall. All these examples show that very small intensity differences between adjacent areas cannot be taken as necessarily indicating that a liver boundary is not present between those areas.

There is therefore a need for new methods of carrying out liver segmentation that lend themselves to automatic, computer-based processing, and yet are able to make accurate determinations based on more than simple intensity differences. Similar methods may also be useful for segmentation of other organs from CT scans, in the abdomen or elsewhere.

SUMMARY

Embodiments generally relate to systems and methods for carrying out automatic organ segmentation in radiological images, such as those obtained by CT. In one embodiment, a method comprises in a first step, rough region segmentation; in a second step, coarse organ segmentation; and in a third step, refinement of organ segmentation. The organ may be a liver. Rough region segmentation may comprise applying standard anatomical knowledge to the CT images. Coarse segmentation may comprise identifying organ voxels using a probabilistic model. Refinement of organ segmentation may comprise refinement based on intensity, followed by refinement based on shape.

In another embodiment, an apparatus comprises one or more processors; and logic encoded in one or more non-transitory media for execution by the one or more processors and when executed operable to automatically segment an organ in CT images, wherein the automatic segmentation comprises in a first step, rough region segmentation; in a second step, coarse organ segmentation; and in a third step, refinement of organ segmentation.

In yet another embodiment, an apparatus comprises one or more processors; and software encoded in one or more non-transitory computer-readable media for execution by the one or more processors and when executed operable to automatically segment an organ in CT images, wherein the automatic segmentation comprises in a first step, rough region segmentation; in a second step, coarse organ segmentation; and in a third step, refinement of organ segmentation.

A further understanding of the nature and the advantages of particular embodiments disclosed herein may be realized by reference of the remaining portions of the specification and the attached drawings.

DETAILED DESCRIPTION OF EMBODIMENTS

Embodiments described herein enable automatic organ segmentation from CT scans. The present invention achieves segmentation with speed and accuracy, addressing some significant drawbacks of current manual approaches.

Figure 1:
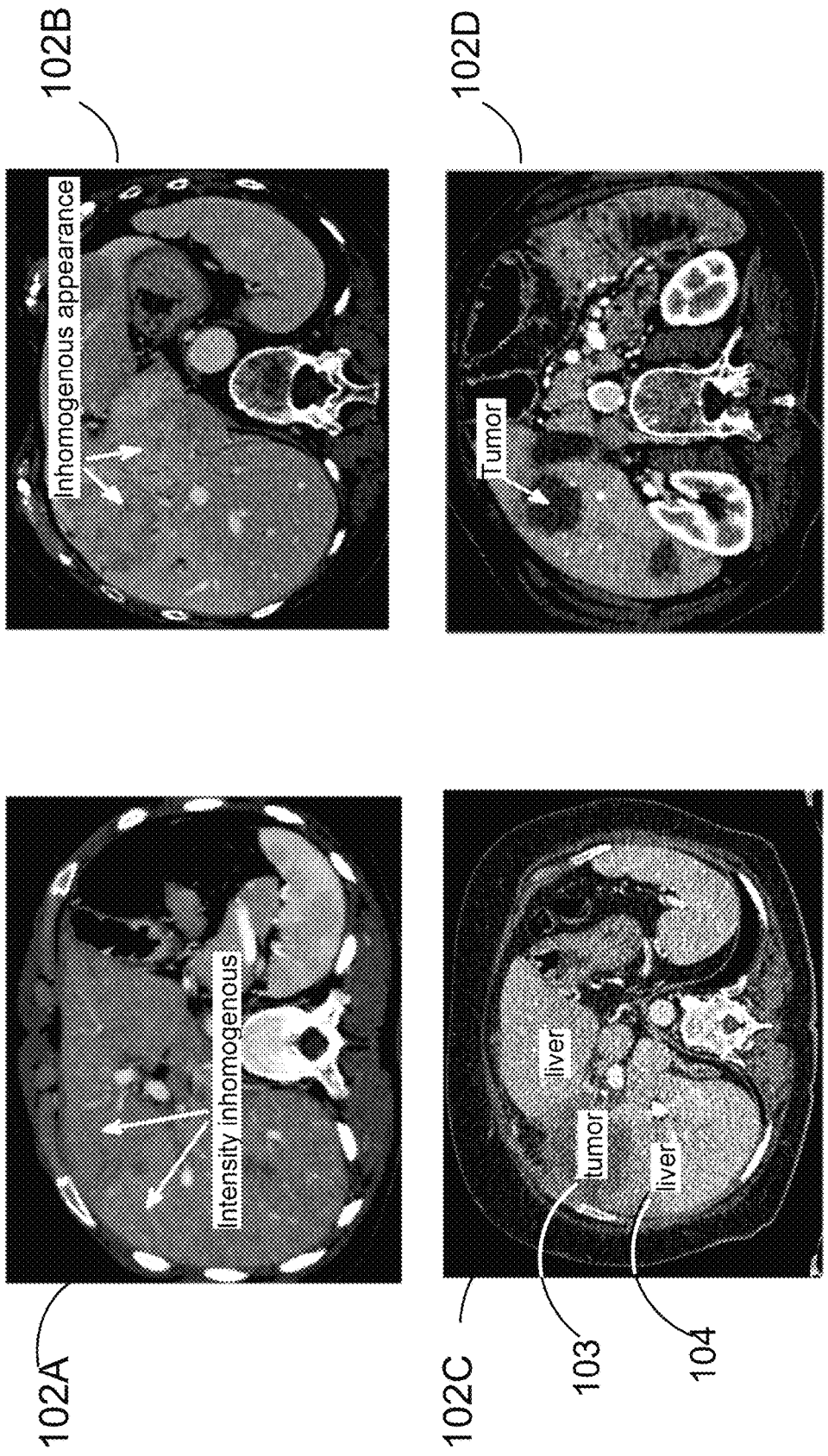
FIG. 1 (Prior Art) illustrates challenges in liver segmentation posed by intensity inhomogeneity within the liver.
Figure 2:
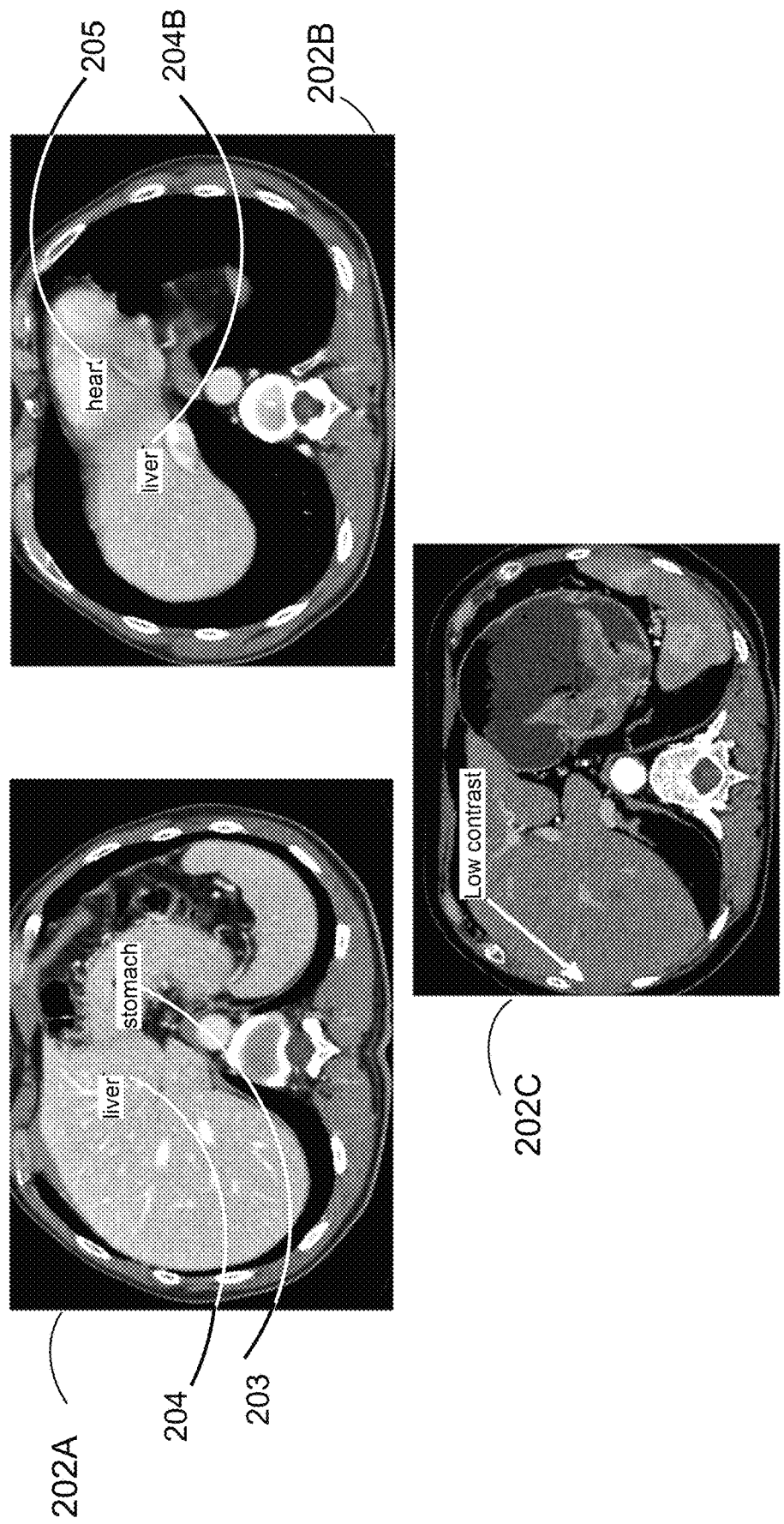
FIG. 2 (Prior Art) illustrates challenges in liver segmentation posed by intensity similarities in the regions just inside and just outside the liver boundary.
Figure 3:
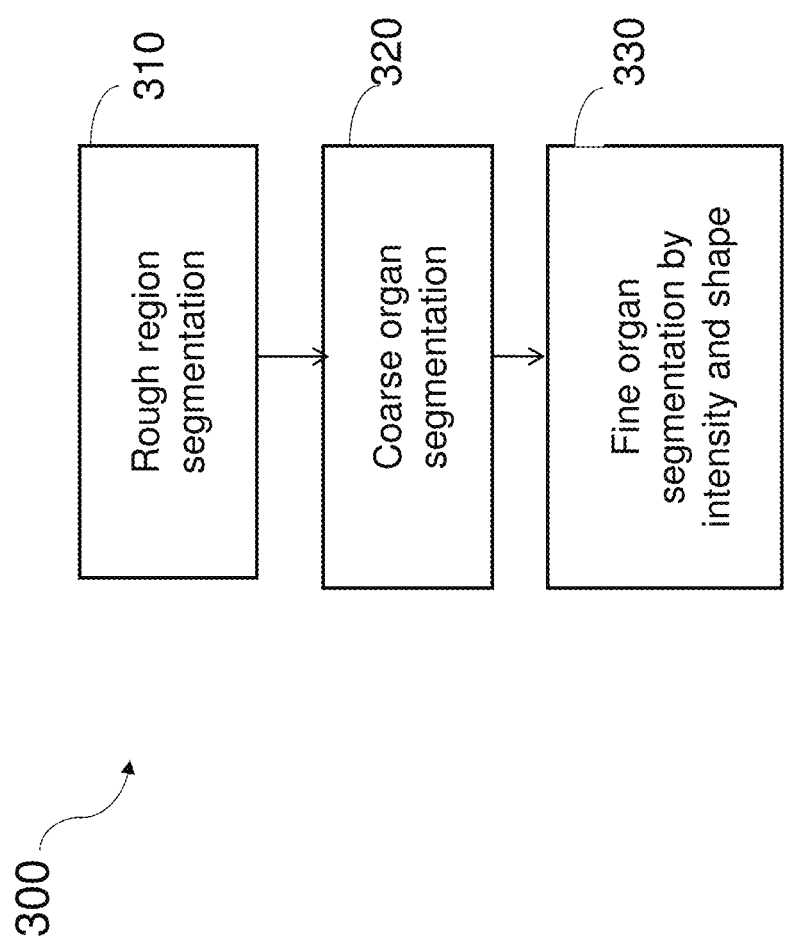
FIG. 3 is a flowchart of a method of organ segmentation according to one embodiment of the present invention.

FIG. 3 is a flowchart of four steps making up a method 300 for segmentation, according to one embodiment. At step 310, a rough estimation is made to delineate in a CT scan the region of the volume being scanned in which the organ of interest is situated. At step 320, the organ of interest is roughly segmented. Finally, at step 330, a finer organ segmentation process is carried out. All these three steps, described in greater detail below, are designed to lend themselves to computer-based processing, with minimal requirements regarding human intervention or control.

Returning to step 310 of method 300, the rough region estimation is made on the basis of well-established facts on anatomical structure. In the case of the liver, for example, it is known that the liver is positioned mostly on the right side of the body, and immediately under the lungs. Its position in relation to the rib cage and spine is also well known.

Figure 4:
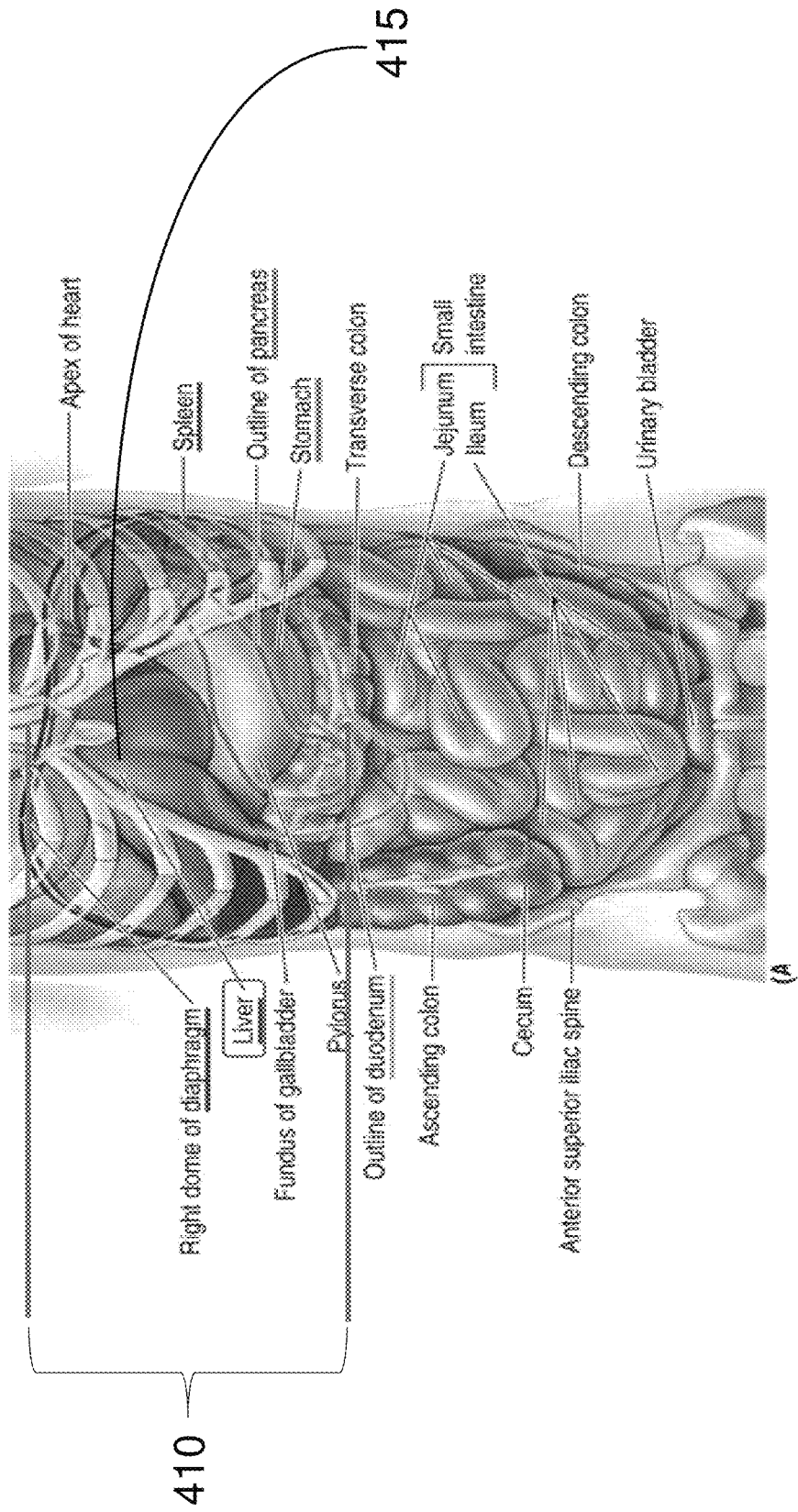
FIG. 4 an anterior "cut-away" view of the body illustrating rough region segmentation according to one embodiment of the present invention.

FIG. 4 is an anterior "cut-away" view of the body, illustrating some of these features. Region 410 at the upper left of the figure may be identified as the region containing the organ of interest, in this case, liver 415, as this region is situated on the right side of the body, includes the part below the thoracic cavity, protected by the rib cage, and lies above the intestines. Returning to the flowchart of FIG. 3, applied to the case where the liver is to be segmented, the output of step 310 would be the portion of the CT scan roughly corresponding to region 410.

Figure 5:
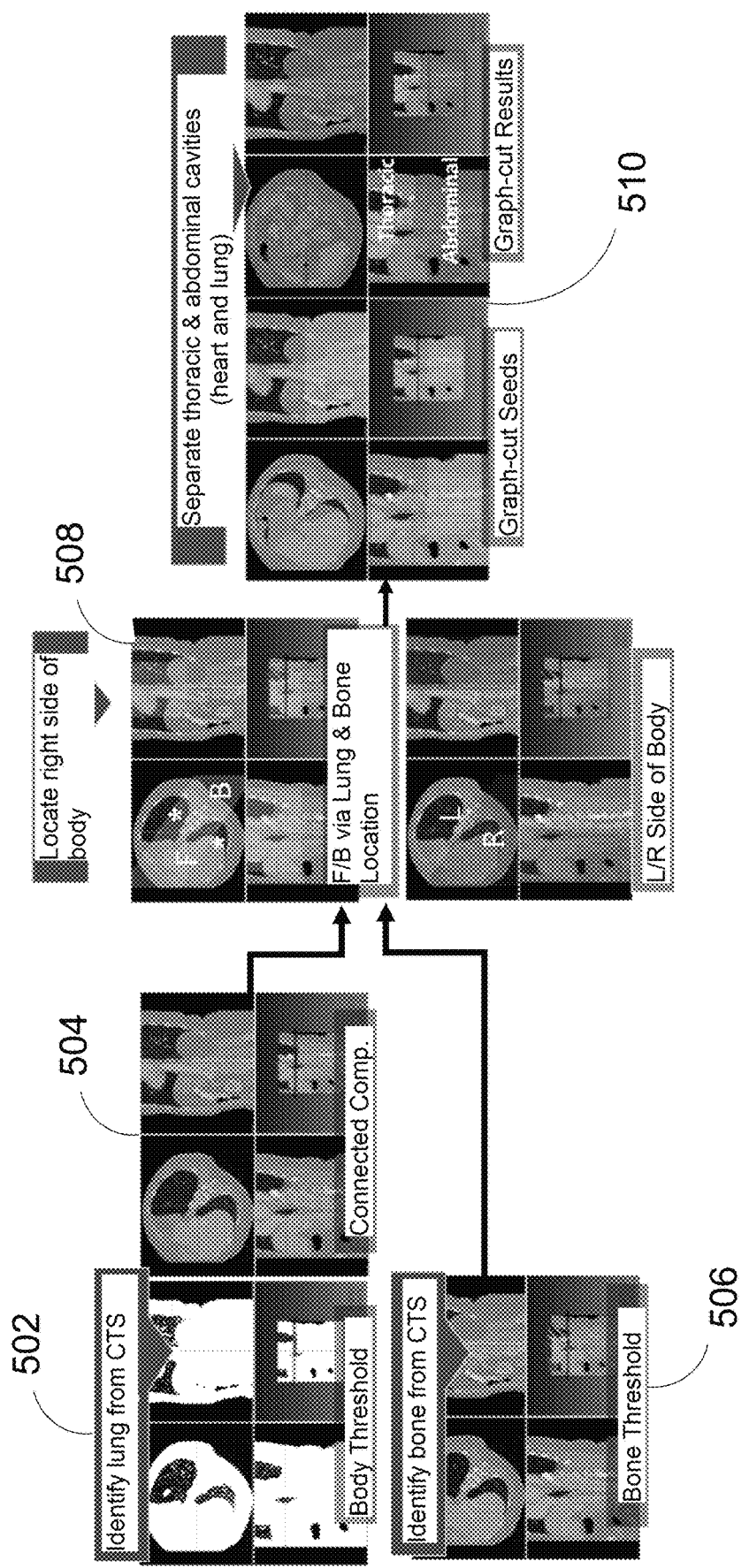
FIG. 5 illustrates details of rough region segmentation according to one embodiment of the present invention.

FIG. 5 illustrates details of rough region segmentation according to one embodiment of the present invention. The liver is the organ of interest in this example. Starting at the left side of the figure, with CT scans shown for illustrative purposes, lungs are identified at 502 by setting an intensity threshold that distinguishes lungs from other organs and tissues in CT scans 502, and carrying out connected component analysis at 504. Bones (of the ribs and spine) are identified at 506 by setting an intensity threshold appropriate for bones. Next, at 508, the front and back of the body are identified on the basis of the locations of the lungs and bones, and the left and right sides of the body are identified on the basis of the front and back of the body as well as the locations of the lungs.

Then, at 510, a graph-cut seeds method is used to allow the thoracic and abdominal cavities to be distinguished from each other.

Figure 6:
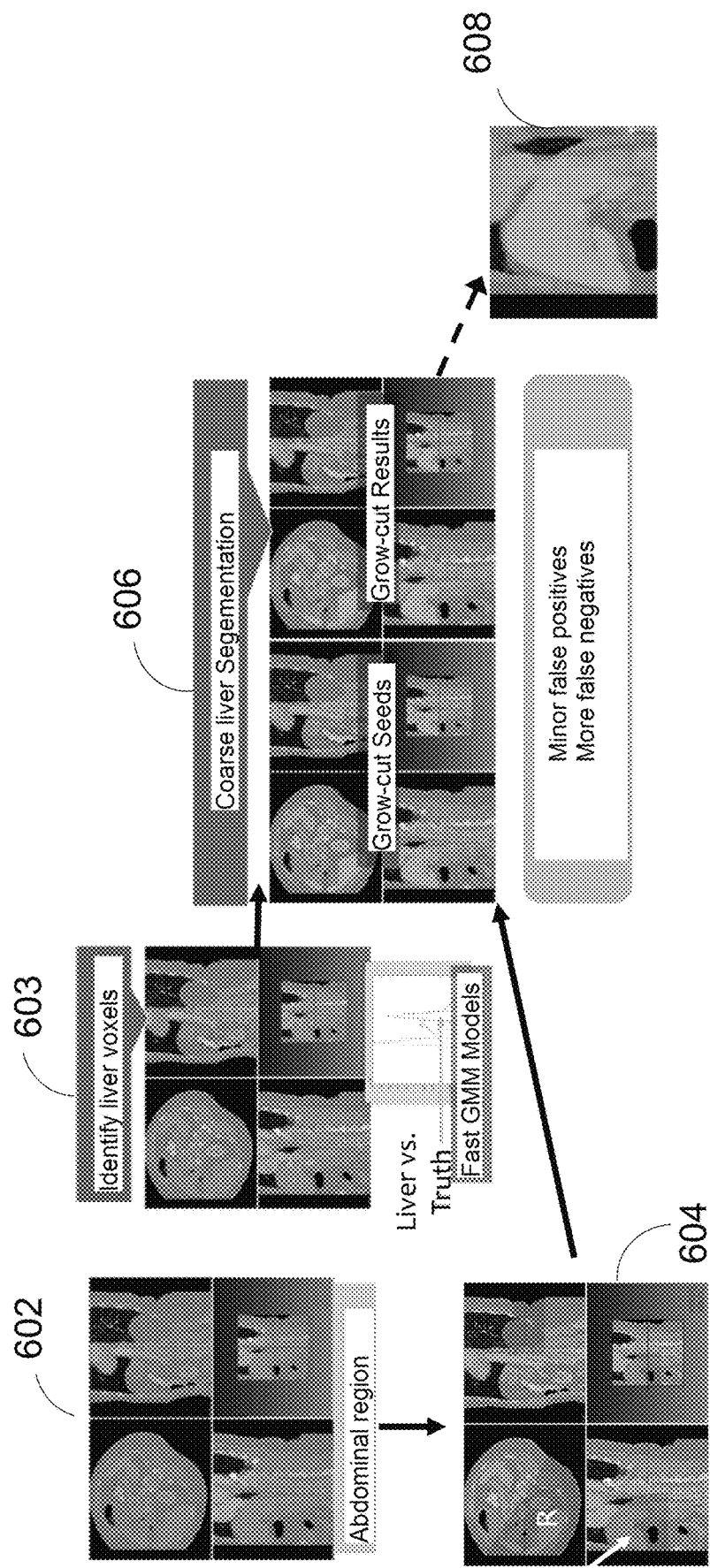
FIG. 6 illustrates coarse organ segmentation according to one embodiment of the present invention.

Returning to step 320 of method 300, FIG. 6 illustrates coarse organ segmentation according to one embodiment of the present invention. The process begins with scans on which rough region estimation has already been carried out—see 602. At 603, a mathematical model, such as a fast Gaussian Mixture Model, is applied, to make statistical inferences on the image voxels corresponding to the liver. The region is defined more accurately at 604, using the well-known anatomical fact that the liver is the largest organ in the abdominal cavity, and focusing attention on the top right hand portion of the abdominal cavity, as indicated by the white arrow in one of the scans shown. Next, some of the liver voxels are identified as "seeds" at 606, and a Grow-cut technique is utilized to provide "Grow-cut result" 608, constituting the desired coarse liver segmentation.

The sequence of steps from 602 through 606 in FIG. 6 typically results in minor false positives, and more false negatives, which is beneficial in providing seeds for subsequent steps of methods of the present invention.

Figure 7:
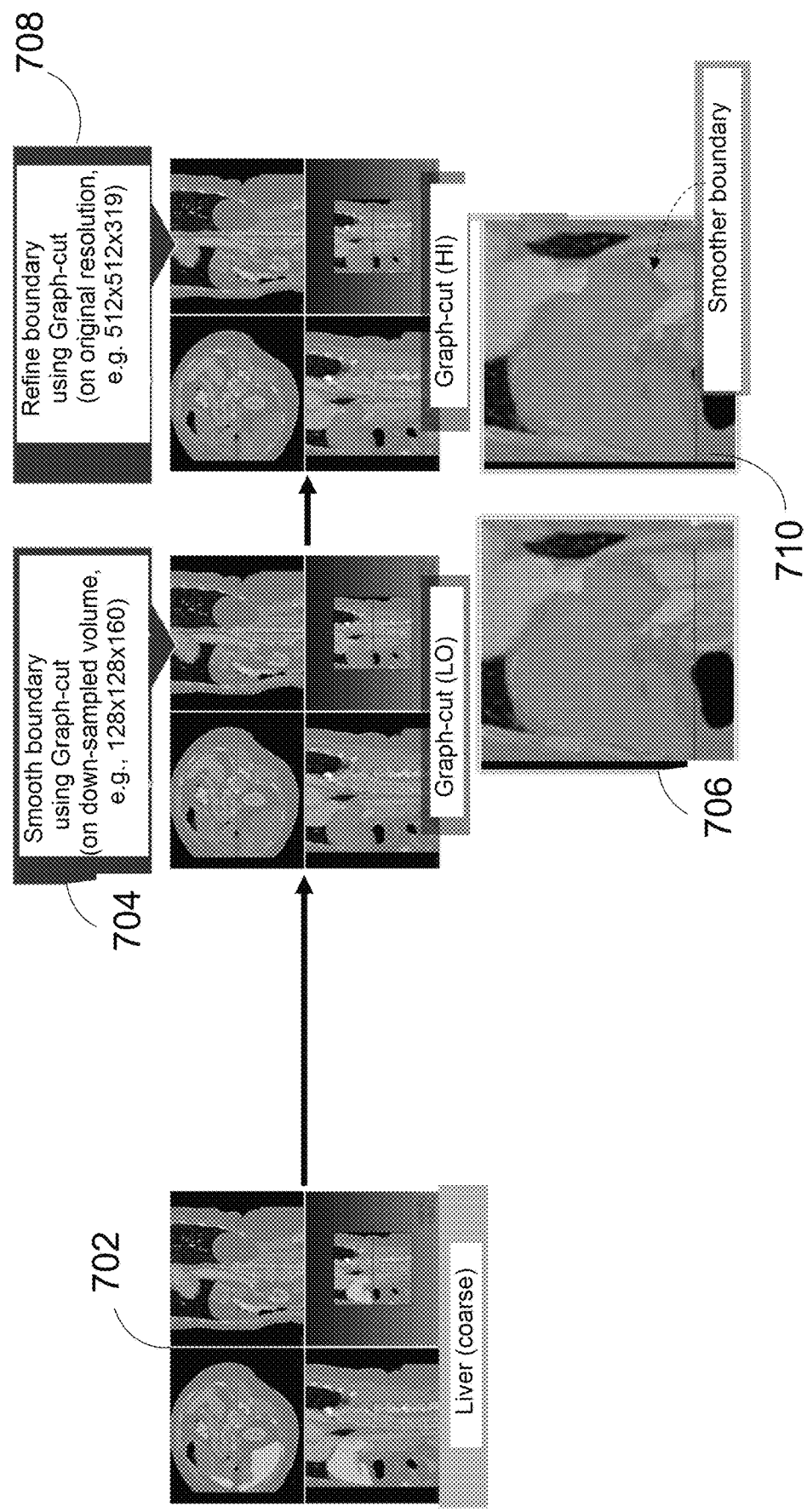
FIG. 7 illustrates one aspect of fine organ segmentation according to one embodiment of the present invention.

Returning to step 330 of method 300, FIG. 7 illustrates how the coarsely segmented liver images at 702 are then refined based on intensity. The boundary of segmentation is first smoothed at 704 by applying a graph cut method to down-sampled ("LO" resolution) versions of the images; this results in segmentation of the organ as shown at 706.

Next, the boundary is smoothened further (or refined) at 708 by applying a graph cut method on just the regions around the identified boundary in images at their original ("HI" resolution. This method uses image gradient information and mean intensity to provide mages in which the organ boundary is significantly smoother, as shown at 710 (see arrow).

It should be noted that prior to the present invention, attempts to carry out intensity-based refinement of coarsely segmented images of organs have applied the mathematical analysis to the whole area of the organ as well as its immediate surroundings, at the full resolution of the original images. This is extremely demanding in terms of processing power and time. The present invention splits the analysis into two parts, carrying out the first part of the process, 704, on lower resolution versions of the images, and only returning to full resolution for the second part of the process, 706, in much more limited regions of the images—around the organ boundary. This new approach drastically reduces the computational burden, making the task a much more practical proposition for medical and surgical practice.

Figure 8:
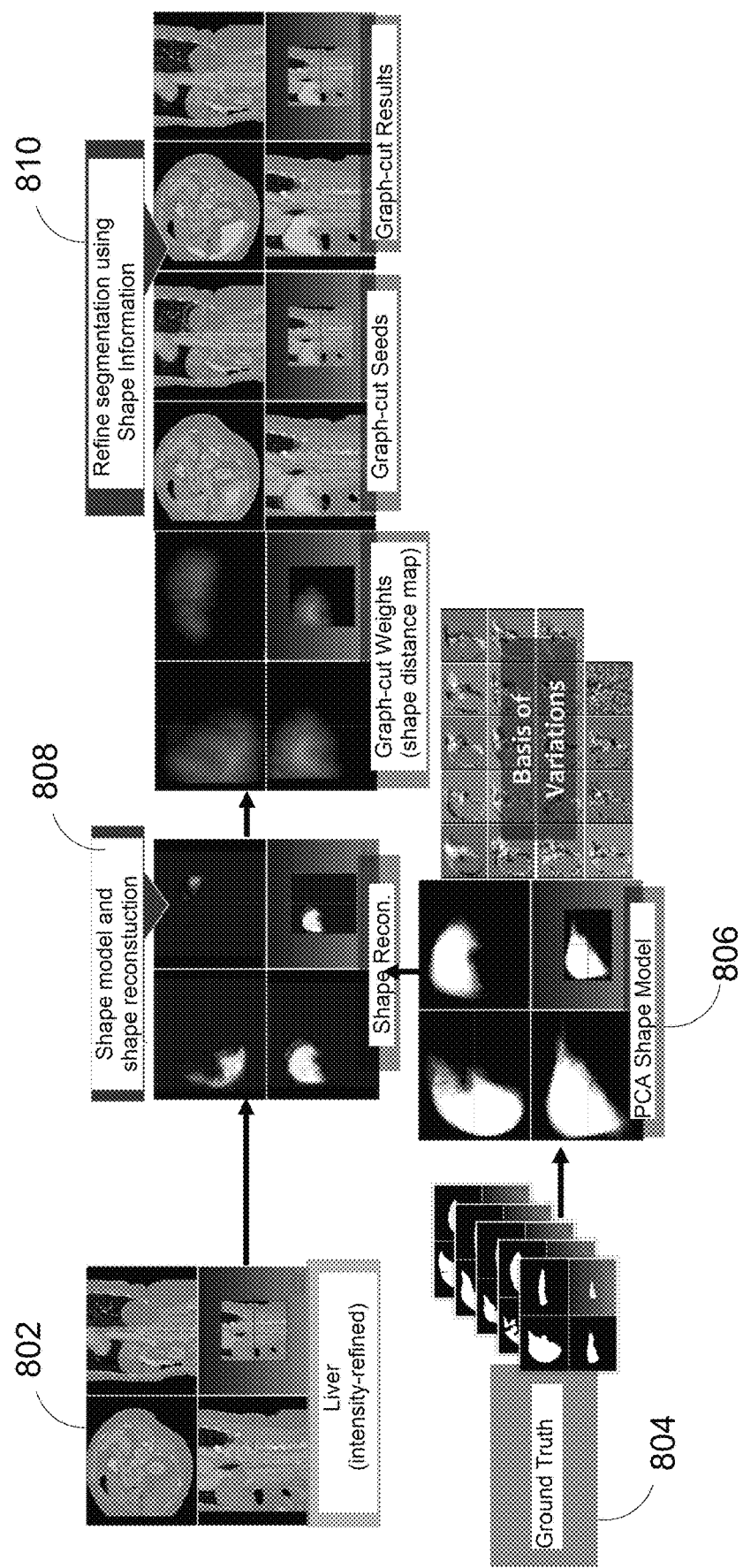
FIG. 8 illustrates another aspect of fine organ segmentation according to one embodiment of the present invention.

FIG. 8 illustrates the remaining portion of step 330 of method 300, showing how segmented liver images 802, refined based on intensity as described above, are then further refined based on shape, by applying a shape model. This addresses the problems of intensity inhomogeneity inside liver, and low contrast across the boundary between liver and other organs.

In the shown embodiment, a PCA shape model 806 is constructed based on PCA analysis of ground truth training data 804. Such data is typically provided by a set of scans previously obtained from other subjects, and analyzed by human experts. After the shape model is established, shape reconstruction of the "test" images, i.e. images 802 that have been refined on the basis of intensity, can then be carried out at 808. Finally, a Graph-cut method is used at 810 on weighted seeds in the images with reconstructed shape, to provide the desired output—a more fully refined segmentation of the organ of interest.

Embodiments described herein provide various benefits to computer-assisted diagnosis and therapy. In particular, embodiments enable a user, typically a radiologist or physician, to quickly and easily obtain accurately segmented CT images of the organ of interest without having to devote undue amounts of time, patience and skill to this one task. These benefits may be especially valuable in preparation for image-guided surgery.

Although the description has been described with respect to particular embodiments thereof, these particular embodiments are merely illustrative, and not restrictive. In particular, although the discussion has focused on liver segmentation, variations of the methods and apparatus applied to perform those methods could be applied to the segmentation of other organs, with similar benefits to those noted above for the particular case of the liver.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for automatic organ segmentation in CT images, the method comprising:
   in a first step, rough region segmentation of an input CT image to provide a first modified CT image showing an organ of interest and surrounding matter, the surrounding matter comprising at least one of another organ and tissue outside the organ of interest, wherein the rough region segmentation comprises using a Graph-cut method and applying anatomical knowledge, known a priori, to the input CT image;
   in a second step, coarse organ segmentation, the second step performed on the first modified CT image to provide a second modified CT image in which the organ of interest is visibly more distinct from the surrounding matter than the organ of interest was in the first modified CT image; and
   in a third step, performed on the second modified CT image, refinement of organ segmentation to provide a third modified CT image in which the organ of interest is distinguished even more sharply and with higher resolution from the surrounding matter than the organ of interest was in the second modified CT image.

2. The method of claim 1, wherein the organ of interest is a liver.

3. The method of claim 1, wherein the coarse organ segmentation comprises:
   identifying voxels of the organ of interest using a probabilistic model.

4. The method of claim 3, wherein the probabilistic model is a Gaussian Mixture Model.

5. The method of claim 3, wherein the coarse organ segmentation further comprises using a Grow-cut method.

6. The method of claim 1, wherein the refinement of organ segmentation comprises refinement based on intensity, followed by refinement based on shape.

7. The method of claim 6, wherein the second modified CT image is characterized by a first resolution, and wherein refinement based on intensity comprises:
   using a Graph-cut method on a down-sampled version of the second modified CT image to identify a smoothened boundary region of the organ of interest; and
   using the Graph-cut method on the second modified CT image at the first resolution on regions adjacent to the identified smoothened boundary region, to provide a first fine segmentation of the organ of interest.

8. The method of claim 7, wherein the refinement of organ segmentation based on shape comprises:
   applying a shape model to the first fine segmentation of the organ of interest to provide a second fine segmentation of the organ of interest.

9. The method of claim 8, wherein the shape model is a PCA shape model, constructed from Ground Truth.

10. The method of claim 8 wherein the applying of the shape model comprises using a Graph-cut method.

11. An apparatus comprising:
    one or more processors; and
    logic encoded in one or more non-transitory media for execution by the one or more processors and when executed operable to automatically segment an organ in CT images, wherein the automatic segmentation comprises:
    in a first step, rough region segmentation of an input CT image to provide a first modified CT image showing an organ of interest and surrounding matter, the surrounding matter comprising at least one of another organ and tissue outside the organ of interest, wherein the rough region segmentation comprises using a Graph-cut method and applying anatomical knowledge, known a priori, to the input CT image;
    in a second step, coarse organ segmentation, the second step performed on the first modified CT image to provide a second modified CT image in which the organ of interest is visibly more distinct from the surrounding matter than the organ of interest was in the first modified CT image; and
    in a third step, performed on the second modified CT image, refinement of organ segmentation to provide a third modified CT image in which the organ of interest is distinguished even more sharply and with higher resolution from the surrounding matter than the organ of interest was in the second modified CT image.

12. The apparatus of claim 11, wherein the organ of interest is a liver.

13. The apparatus of claim 11, wherein the refinement of organ segmentation comprises refinement based on intensity, followed by refinement based on shape.

14. The apparatus of claim 13, wherein the second modified CT image is characterized by a first resolution, and wherein refinement based on intensity comprises:
    using a Graph-cut method on a down-sampled version of the second modified CT image to identify a smoothened boundary region of the organ of interest; and using the Graph-cut method on the second modified CT image at the first resolution on regions adjacent to the identified smoothened boundary region, to provide a first fine segmentation of the organ of interest.

15. The apparatus of claim 14, wherein the refinement of organ segmentation based on shape comprises:
applying a shape model to the first fine segmentation of the organ of interest to provide a second fine segmentation of the organ of interest.

16. An apparatus comprising:
one or more processors; and
software encoded in one or more non-transitory computer-readable media for execution by the one or more processors and when executed operable to automatically segment organs in CT images, wherein the automatic segmentation comprises:
in a first step, rough region segmentation of an input CT image to provide a first modified CT image showing an organ of interest and surrounding matter, the surrounding matter comprising at least one of another organ and tissue outside the organ of interest, wherein the rough region segmentation comprises using a Graph-cut method and applying anatomical knowledge, known a priori, to the input CT image;
in a second step, coarse organ segmentation, the second step performed on the first modified CT image to provide a second modified CT image in which the organ of interest is visibly more distinct from the surrounding matter than the organ of interest was in the first modified CT image; and
in a third step, performed on the second modified CT image, refinement of organ segmentation to provide a third modified CT image in which the organ of interest is distinguished even more sharply and with higher resolution from the surrounding matter than the organ of interest was in the second modified CT image.

17. The apparatus of claim 16, wherein the second modified CT image is characterized by a first resolution, and wherein refinement based on intensity comprises:
using a Graph-cut method on a down-sampled version of the second modified CT image to identify a smoothened boundary region of the organ of interest; and
using the Graph-cut method on the second modified CT image at the first resolution on regions adjacent to the identified smoothened boundary region, to provide a first fine segmentation of the organ of interest.

18. The apparatus of claim 17, wherein the refinement of organ segmentation based on shape comprises:
applying a shape model to the first fine segmentation of the organ of interest to provide a second fine segmentation of the organ of interest.

* * * * *